No. 818,239. PATENTED APR. 17, 1906.
E. FIRNHABER.
ANIMAL TRAP.
APPLICATION FILED OCT. 13, 1905.

WITNESSES:
D. E. Carlsen.
M. Carlsen.

INVENTOR.
Edward Firnhaber.
BY his ATTORNEY:
A. M. Carlsen.

UNITED STATES PATENT OFFICE.

EDWARD FIRNHABER, OF JANESVILLE, MINNESOTA.

ANIMAL-TRAP.

No. 818,239.   Specification of Letters Patent.   Patented April 17, 1906.

Application filed October 13, 1905. Serial No. 282,608.

*To all whom it may concern:*

Be it known that I, EDWARD FIRNHABER, a citizen of the United States, residing at Janesville, in the county of Waseca and State of Minnesota, have invented certain new and useful Improvements in Animal-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to animal-traps, and is an improvement upon the construction of animal-traps set forth in my United States Patent No. 794,856, issued on July 18, 1905; and the objects are, first, to so improve upon said former construction that the frame of the trap may be easily and cheaply made from sheet metal; second, that the frame may hold itself in position without screwing it to the floor; third, that the trap may be readily movable from place to place; fourth, to make the trap fit as close as possible into the angle formed by the floor and wall or partition of a house, and thus get into the regular pathway of mice and rats; fifth, to provide the trap with further means for holding the caught animal; sixth, to improve the trap as an article of manufacture in general. These and other objects I attain by the novel construction and arrangement of parts illustrated in the accompanying drawings, in which—

Figure 1:
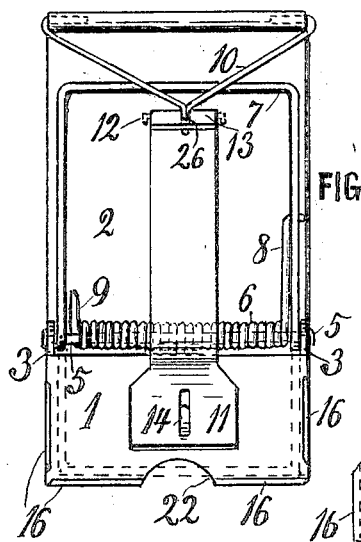
Figure 2:
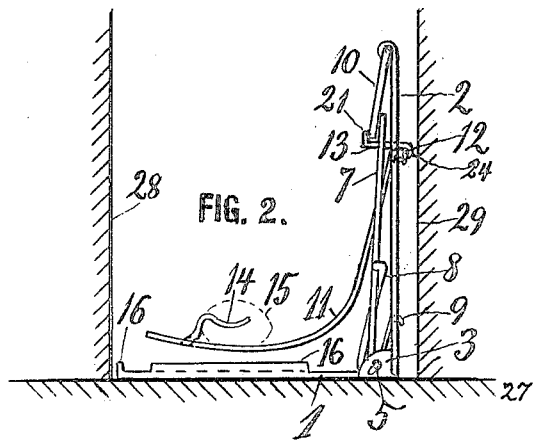
Figure 3:
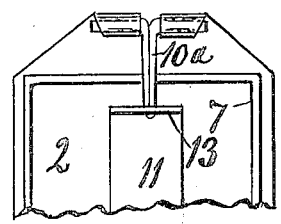
Figure 4:
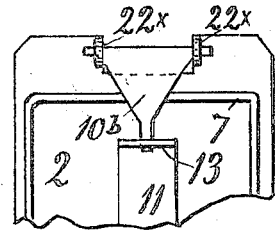
Figure 5:
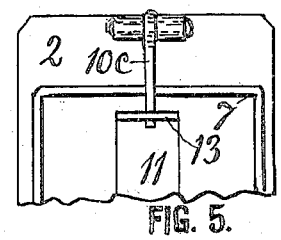
Figure 6:
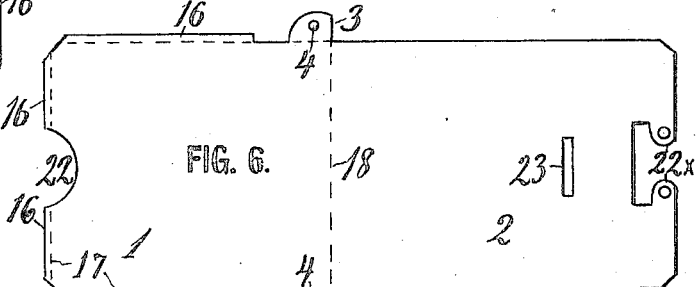
Figure 7:
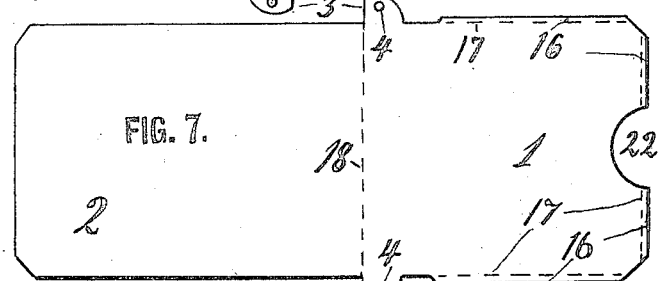
Figure 8:
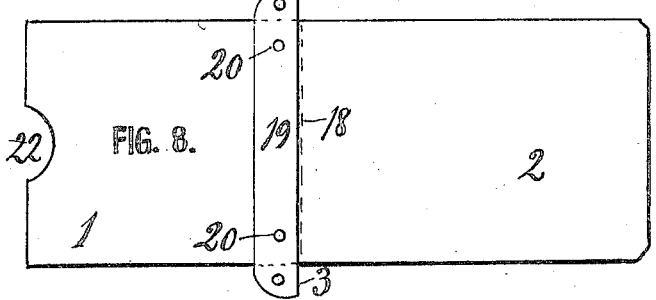

Figure 1 is a perspective front elevation of the improved trap with the striker "set" and in dotted lines as tripped. Fig. 2 is a side elevation of the trap with the upper end of the trigger modified and shown as standing on a floor and fitting closely to a wall in front or in rear of it, as the case may be. Figs. 3, 4, and 5 are various modifications of the upper portion of Fig. 1. Fig. 6 is a blank of sheet metal from which the frame is made, the top end of it being in this view on the principle shown in Fig. 4. Fig. 7 is a partly-finished blank for the frame in general. Fig. 8 is a modification in the construction of the frame-blank.

Referring to the drawings by reference-numerals, the frame of the trap is L-shaped and is formed of a single elongated piece of sheet-tin or other sheet metal bent near the middle at substantially a right angle, so as to form a foot-piece or base 1 and a standard 2. In said angular bend the frame is provided at each side with a lug 3, forming a brace against the front side of the standard and at the same time supporting in holes 4 the ends of a bar 5, the latter extending through and supporting the coiled spring 6 and the bail-shaped striker 7, of which the latter has its legs formed with eyes encircling the shaft 5 and is at all times impelled forward and downward against the base 1 by the arm 8 of the spring, whose other end 9 finds support against the frame, into which it may also be secured, as indicated at 9 in Fig. 2.

The striker is held in its upper or set position by a trip-lever 10, pivotally suspended from the upper end of the standard, and a trigger 11, pivotally suspended at 12 from the standard and having a short upper arm 13 engaging the end of the trip-lever and a long, broad, forwardly-curved lower arm for the animal to step on. It is also provided with a bait-hook 14, struck up from the metal, and thus forming a cheaply-made and firmly-secured hook, it being made integral with the trigger.

In Fig. 2, 15 represents bait held by the hook. The base 1 is formed with upstanding edges or rims 16, which coact with the striker 7 in holding the caught animal, the striker falling but a short distance inside the rims. The latter, which are of almost no cost to make, assist so much in holding the animal that the spring actuating the striker and the mechanism controlling it may be made considerably lighter, and thereby cheaper. The dotted lines 17 in Figs. 6 and 7 indicate the line at which the blanks should be bent to form the rims 16, while the lines 18 are where the blank should be bent to its angular shape in Fig. 2. In order to save metal, the blanks may be stamped out in the reversed order shown by the relative position of blanks, Figs. 6 and 7, and for large traps material is further saved by forming the lugs 3 at the ends of a narrow metal strip 19, (see Fig. 8,) which is secured by rivet 20 across the blank.

In Figs. 3, 4, and 5 is illustrated at $10^a$, $10^b$, and $10^c$, respectively, some of the modified forms in which the trip-lever may be made and pivotally suspended from the top of the frame. These views are so clear that no further description is deemed necessary.

In Fig. 2 is shown how the trigger-arm 13 may have a hook 21 to engage the trip 10, as preferable to the hole 26 in Fig. 1 and in my former patent. 22 is a notch in the base to admit the finger to get hold of the striker and raise it. To the right in Fig. 6 is shown how the lips 22× are stamped out integral with the blank before they are bent, as in Fig. 4.

By using the lips or lugs 3 as braces the standard may be comparatively light and still be able to hold the striker and spring in set position without bending forward.

As best shown in Figs. 6, 2, and 1, the standard has an aperture 23 in which a loop 24, formed on the trigger 11, is loosely retained by a pin 12 at the back of the standard, while the two arms of the trigger swing vertically in front of the standard.

It should be observed that the fulcrum of the trip 11 is so high up that the trigger 10 need not be long enough to reach the animal and push it away the moment it should get caught, as is the case with earlier-constructed traps otherwise resembling mine.

As already mentioned, the lower arm of the trigger is widened to make a platform which the animal is tempted to step on to reach the bait or else in passing the trap, which is usually set, as in Fig. 2, where 27 represents the floor upon which the trap may be set either with the front to the wall 28 or the rear to the wall 29. In either position it appears as innocent and unobstructive as possible to the mice and rats, whose usual road is along the walls in the rooms.

The trap may be used with or without bait and may be made in various sizes, but is especially adapted for mice and rats.

Having thus described the invention, what I claim as new, and desire to secure by Letters Patent, is—

1. As an improved article of manufacture, an animal-trap consisting of an elongated sheet-metal frame bent to form a base and an upright, and having at the bend the perforated lugs 3, and at the top of the upright a pair of perforated lugs, a bar inserted in the lugs 3, a striking-bail pivotally placed on the bar, and a spring on the bar for driving the striker, a comparatively short trigger trunnioned in the upper lugs and adapted to engage and hold the striker in its set position, the lever 11 pivotally suspended from the upper part of the front side of the upright and having at its lower end a long horizontal arm acting as a treadle for the animal, and at its upper end a shorter horizontal arm adapted to engage the end of the trigger to hold the trap set.

2. As an improved article of manufacture, an animal-trap consisting of an elongated sheet-metal frame bent to form a base and an upright, and having at the bend the perforated lugs 3, and at the top of the upright two perforated lugs, a three-armed trigger having one arm inserted in each of said lugs and the third arm hanging downward therefrom, a bar in the lower lugs, a spring-actuated striker on the bar, a bow-shaped lever pivoted upon the front side of the upright near the upper end thereof and being formed with a lower horizontal arm serving as a treadle for the animal, and an upper horizontal arm having a hole for engaging the lower arm of the trigger; said lever being formed near its top with a horizontally-broad tongue at its back side, and said upright having a horizontal slot receiving loosely said tongue, and means for retaining said tongue in the slot, the bow shape of the lever being to clear the bar and spring, and the trunnions of the trigger being to prevent side motion of said member.

In testimony whereof I affix my signature in presence of two witnesses.

EDWARD FIRNHABER.

Witnesses:
E DIEUDONNE,
W. A. BORN.